United States Patent [19]

Marchionni et al.

[11] Patent Number: 5,143,589
[45] Date of Patent: Sep. 1, 1992

[54] PERFLUOROPOLYETHERS CONTAINING A HALOGEN DIFFERENT FROM FLUORINE AND HAVING AN ACID END GROUP

[75] Inventors: Giuseppe Marchionni; Anna Staccione, both of Milan, Italy

[73] Assignee: Ausimont, S.r.L., Milan, Italy

[21] Appl. No.: 648,328

[22] Filed: Jan. 29, 1991

Related U.S. Application Data

[63] Continuation of Ser. No. 346,458, May 2, 1989, abandoned.

[30] Foreign Application Priority Data

May 2, 1988 [IT] Italy .............................. 20406 A/88

[51] Int. Cl.$^5$ .............................................. C07C 41/01
[52] U.S. Cl. ...................... 204/157.92; 204/157.94; 204/157.88; 568/601; 568/416
[58] Field of Search ................. 204/157.92, 157.94, 204/157.88, 157.89, 157.15; 568/601, 416, 404

[56] References Cited

U.S. PATENT DOCUMENTS

| | | | |
|---|---|---|---|
| 3,715,378 | 2/1973 | Sianesi et al. ...................... 260/463 |
| 4,451,646 | 5/1984 | Sianesi et al. ...................... 528/401 |
| 4,745,009 | 5/1988 | Piacenti et al. .................... 427/393.5 |
| 4,820,588 | 4/1989 | Brinduse et al. ................ 204/157.92 |
| 4,855,025 | 8/1989 | Gautier et al. .................. 204/157.89 |
| 4,859,299 | 8/1989 | Kobayashi et al. ............ 205/157.92 |
| 4,952,735 | 9/1990 | Kobayashi et al. .................. 568/560 |

FOREIGN PATENT DOCUMENTS

| | | |
|---|---|---|
| 192493 | 2/1986 | European Pat. Off. . |
| 195946 | 10/1986 | European Pat. Off. . |
| 3739447 | 6/1988 | Fed. Rep. of Germany . |

Primary Examiner—John Niebling
Assistant Examiner—Arun S. Phasge
Attorney, Agent, or Firm—Morgan & Finnegan

[57] ABSTRACT

Perfluoropolyethers having an acid end group of the type of acyl fluoride (or chloride) or a carboxylic group or derivatives thereof, the other end group being a perfluoroalkyl containing one or two halogen atoms different from fluorine, are prepared by photooxidation of $C_3F_6$ and/or $C_2F_4$, in the presence of a fully halogenated ethylene containing 1 to 4, preferably 1 or 2 atoms of halogen different from fluorine, and by the subsequent thermal of photochemical decomposition treatment of the peroxide groups which are present in the photooxidation product.

3 Claims, No Drawings

PERFLUOROPOLYETHERS CONTAINING A HALOGEN DIFFERENT FROM FLUORINE AND HAVING AN ACID END GROUP

This is a continuation of application Ser. No. 346,458, filed on May 2, 1989, now abandoned.

DESCRIPTION OF THE INVENTION

The present invention relates to perfluoropolyethers characterized in that they have, at one end, a functional acid group such as acyl halide or a carboxylic group or derivatives thereof (salts, esters), and, at the other end, a perfluoroalkyl group containing a halogen atom different from fluorine.

The products of the invention are prepared by a photooxidation process starting from perfluoropropene and/or tetrafluoroethylene and a minor amount of a fully fluorohalogenated ethylene containing at least one halogen atom different from fluorine. The photooxidation product is then subjected to thermal or photochemical treatment to remove the peroxide groups contained therein.

The process for photooxidizing perfluoroolefins, in particular $C_3F_6$ and/or $C_2F_4$, is well known from earlier patents GB 1,189,337, GB 1,104,482; U.S. Pat. No. 3,683,027 and U.S. Pat. No. 3,175,378. By the known processes for photooxidizing $C_3F_6$ and by subsequent thermal decomposition of the peroxides groups,, it is possible to obtain mixtures of products having a perfluoropolyether structure with neutral (perfluoroalkyl) and acid (acyl fluoride group

and derivatives) end groups, where the latter are present in a minor amount. Generally they are present in not more than 30% of the perfluoroether chains.

This is due also the fact that during photooxidation many acid end groups of the type of fluoroformates

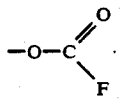

are formed, which, during the subsequent thermal treatment for decomposing the peroxide groups, give rise to the ketone end group $-CF_2COCF_3$ (having no acid function).

If the products to be obtained are those having an acid end group, their separation, in the form of a fraction having a high monoacid product content, is very difficult, and indeed practically impossible in particular for the products with a not very low molecular weight.

At any rate, such processes are very expensive and of slight interest from an industrial viewpoint.

Applicants have, quite surprisingly, found in accordance with the present invention that by using a fully halogenated ethylene of the type specified below it is possible to prepare perfluoropolyethers with acid end groups and very high yields, which are equal to or higher than 90% by weight.

In the photooxidation process according to the present invention, the halogenated ethylene, which is indicated for the sake of simplicity as $X-CF=CF_2$, where $X=Cl$ or Br, selectively reacts to give the species: $Rf-O-CF_2-CFXO^\circ$, which quantitatively gives: $Rf-O-CF_2-COF + X^\circ$ and $X^\circ$ reacts with olefin (b) $CF_2=CF-Y$ (where $Y=F$ or $CF_3$) to give species $XCF_2CFY$, which starts a new chain.

Thus, fluorohalogenated ethylene $XCF=CF_2$ acts as a chain transfer agent (thereby permitting a molecular weight regulation) which generates two stable end groups, one containing Br or Cl, the other being acid.

The products of the present invention are characterized in that they have a structure as defined by the general formulas reported below.

When the starting perfluoroolefin is $C_3F_6$, the products obtained through the process of the present invention have the following general formula:

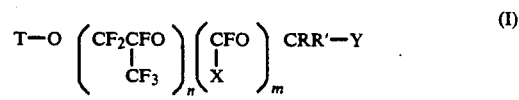

where: X is F of $CF_3$; R=F or Cl or Br or I; R', alike or different from R, is also F or Cl or Br or I.

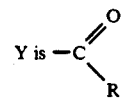

where:

R is the same as defined above and in particular is Cl or F, or Y is the corresponding carboxylic group —COOH or the salts or esters thereof, such as esters of aliphatic alcohols containing from 1 to 10 carbon atoms;

T is perfluoroalkyl group containing one or two atoms of Cl or Br or I; in particular it may be Alog $CF_2-$, Alog $CFCF_2-$,
       |
       $CR_3$ Alog $CF_2CF(CF_3)$, where Alog is Cl or Br or I; or in other words, a perfluoroalkyl group wherein one or two of the halogen atoms may be chlorine or bromine or iodine, the remaining halogen atoms being fluorine;

n ranges from 1 to 15;

with m/n ranging from 0.01 to 0.5;

and where units

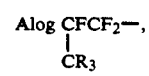

are distributed at random along the chain.

By the use of $C_2F_4$ as a starting perfluoroolefin, products having the following general formula are obtained:

$$T'-O(CF_3CF_2O)_p(CF_2O)_s CRR'Y \quad (II)$$

where:

$T'=$ Alog $CF_2CF_2-$, Alog $CF_2-$, Alog $CF_2CF$ (Alog)—,

R', R, Alog, Y are the same as defined above for formula (I), p ranges from 1 to 20 and s/p from 0.5 to 2.

If a mixture of $C_2F_4+C_3F_6$ is utilized, the resulting products have the following structure:

(III)

where:

Y, X, R and R' are the same as defined above for formula (I),

T" is the same as T or T', o and q are integers, zero included, $o+q=1$ to 20, $z/o+q=0.01$ to 0.05.

For $n>15$ in formula I, for $p>20$ in formula II, for $o+p>20$ in formula III, it is possible to obtain, besides the product of formula I or II or III, also products corresponding to said formulas, where their end groups, however, are both perfluorohalogenalkyls or both alkyl halide (i.e., acid groups Y). In such mixtures, which comprise at least 50% by weight of a product of formula I or II or III, the end groups ratio T/Y is always about 1, in other words; they exhibit a functionality (referred to acid groups Y) of about 1.

These mixtures may be used in the fields of application indicated for the products of the above formulas I, II, and III.

The process for preparing the compounds according to the present invention comprises the photooxidation of the perfluoroolefin ($C_3F_6$ and/or $C_2F_4$) in the presence of a minor amount (up to 50% by moles and, in the cases of a higher practical interest, up to 20%) of a fully halogenated ethylene containing at least one atom of Cl or Br or I, by means of gaseous $O_2$ and by irradiating with ultraviolet rays (wavelength from 2,000 to 6000 Å) the liquid reaction mixture maintained at a temperature from $-20°$ C. to $-100°$ C., and preferably from $-50°$ C. to $-60°$ C., either in the presence or absence of solvents. The liquid reaction mixture, which initially consists of $C_3F_6$, and a chlorofluorocarbon solvent or other inert solvent, is maintained at the above temperature. The perhalogenated ethylene is introduced into the reaction mixture simultaneously with the $O_2$ flow. The fully halogenated ethylenes preferably contain 1 to 2 atoms of a halogen different from fluorine. As a perhalogenated ethylene it is possible to use in particular $CF_2=CFCl$, $CFCl=CFCl$, $CF_2=CCl_2$, $CFCl=CCl_2$, $CF_2=CFBr$. the photooxidation product is subjected to thermal treatment at a temperature of $180°$-$220°$ c., or to a photochemical treatment by the use of ultraviolet radiations for such a time as is sufficient to decompose the peroxide groups which are present in the perfluoropolyether chain.

Instead of carrying out the thermal or photochemical treatment directly on the photooxidation product, it may be effected after hydrolysis of the group;

which is converted to group —COOH, thus giving rise to a less volatile product.

By the process of the present invention it is possible to obtain in particular, starting from $C_3F_6$, a perfluoropolyether having a not high molecular weight, suitable for most of the practical uses, corresponding to the above formula I.

As regards utilization, in the first place, it is used as a fluorinated surfactant in the form of a salified monocarboxylic acid (ammonium salt or alkali metal salt), or in the protection of monuments and of stony materials in general against atmospheric agents, as is described in European patent application EP 215,492.

If $C_2F_4$ is utilized as a starting perfluoroolefin, it is possible to obtain photooxidation products having a not high or at any rate a predetermined molecular weight, which is much lower than the molecular weight obtained in the absence of perhalogenated ethylene, and suitable for most of the possible utilizations, so avoiding specific treatment (scission) for reducing the high molecular weights.

The available analysis methods, for example N.M.R., mass spectrophotometry and determination of the halogen (other than fluorine) content, do not reveal that oxyalkylene units, deriving from the perhalogenated ethylene utilized in the photooxidation, are present in the chain. Only in the synthesis of perfluoropolyether products having a high molecular weight, for example higher than 2000, it is assumed that negligible amounts, generally below 3% of the total, of the above oxyalkylene units containing one or more atoms of halogen different from fluorine, may be arranged along the chains. However, the methods of analysis indicated herein do not permit an exact determination of small amounts of said units in the chain.

EXAMPLES

The following examples are given merely to illustrate the present invention and are not to be considered as a limitation thereof.

EXAMPLE 1-4

Photooxidation of $C_3F_6+CFCl=CF_2$

Into a cylindrical glass reactor (volume=500 ml, optic path=1 cm) equipped with an inner coaxial quartz sheath and furthermore equipped with a dipping pipe for introducing the gases, having a sheath with a thermocouple for detecting the inner temperature, and with a reflux cooler maintained at a temperature of $-80°$ C., there were introduced 800 g of $C_3F_6$ at a temperature of $-60°$ C. A gas mixture consisting of 27 l/h of $O_2$ and of 3 l/h of $C_2F_3Cl$ was made to bubble into the reactor through the dipping pipe. By means of a refrigerating bath placed outside the reactor, the temperature of the reacting liquid phase was maintained during the whole test at a predetermined value for each test, as indicated below, in Table 1.

After having introduced into the quartz sheath an ultraviolet ray lamp HANAU TQ 150 (which emits 47 watts of ultraviolet radiations having a wave-length ranging from 2000 to 3000 Å), the lamp was switched on, and the irradiation and the feeding of the action gases were continued for 5 hours.

After a 5-hour irradiation, the lamp was switched off, degassing was effected and the unreacted $C_3F_6$ was recovered from the reactor by evaporation at room temperature. An oily polymeric residue was obtained.

This residue was subjected to iodometric analysis in order to calculate the active (peroxy) oxygen content, and to NMR $^{19}$F analysis, which revealed that the residue was composed of polyether chains of the type:

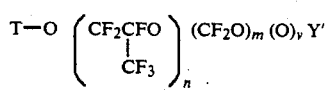     (IV)

where:

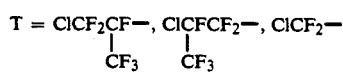

with a marked prevalence of the first two end group types:

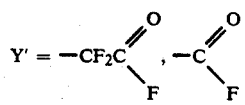

the second type being present in an amount <5% of end groups Y'.

The m/n ratio was very low (<0.05).

The viscosity of the product at 20° C., indicated in Table 1 for each example, was determined by means of an Ostwald-Fenske viscosimeter.

The infrared analysis revealed the bands which are typical of groups:

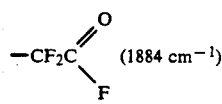

Reaction conditions and characteristics of the resulting oily product are reported below in Table 1.

TABLE 1

| Example No. | T (°C.) | Time (h) | O₂ l/h | CTFE l/h | Product g/h | P.O. (*) | Viscosity cSt |
|---|---|---|---|---|---|---|---|
| 1 | −60 | 5 | 27 | 3 | 66 | 0.6 | 6.9 |
| 2 | −60 | 5 | 27 | 3 | 72 | 0.5 | 5.7 |
| 3 | −60 | 5 | 26 | 4 | 74 | 0.8 | 7.3 |
| 4 | −50 | 5 | 27 | 3 | 65 | 0.6 | 4.5 |

(*) peroxy oxygen in % by weight.

The mass spectrometric analysis confirmed both the presence of the end groups revealed by the NMR analysis, and the absence of units —CFCl—CF₂O— in the chain. On NMR analysis the product of Example 2 exhibits an m/n ratio equal to 0.01 and a molecular weight of 960.

The chlorine analysis indicated a Cl content of 4.2% by weight.

On the assumption that the product contains only one chlorine atom per chain, as is represented in the above formula, a molecular weight equal to 840 is calculated.

EXAMPLE 5

Hydrolysis and Thermal Treatment

The product obtained in Example 2 was treated with an H₂O-saturated nitrogen flow in order to hydrolyze the predominant end groups:

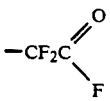

(>95% with respect to end groups Y') to —CF₂COOH and end groups

present in an amount <5%) to

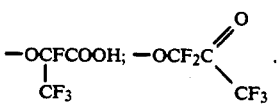

The hydrolyzed product was then thermally treated by heating up to 210° C. in order to remove the peroxide groups. The thermal treatment was effected after the hydrolysis in order to avoid treating at a high temperature a product having a too high volatility.

313.5 g of a non-peroxy product were obtained (yield=95%).

EXAMPLE 6

Distillation of the Product

An amount of 71 g of the product obtained in Example 5 was subjected to distillation at atmospheric pressure in order to obtain information about the molecular weight distribution. The results are reported on Table 2, which shows that 50% of the distillate has a molecular weight ranging from 400 to 700.

EXAMPLE 7

Evaluation of the Neutral Products (a) A first portion of 184.2 g of the product obtained according to Example 5 was treated with 120 ml of water and 15 g of CaO and reacted for 6 hours under stirring. The reaction mass was then subjected to distillation at atmospheric pressure and at a head temperature of 90°-95° C.

TABLE 2

| T (°C.) Boiler | T (°C.) Distillate | Fraction (g) | M.W. |
|---|---|---|---|
| 113 | 80 | — | — |
| 190 | 115 | 7.2 | 180 |
| 245 | 170 | *7.1 | *400 |
| 262 | 190 | 7.3 | 540 |
| 290 | 194 | 7.0 | 540 |
| 320 | 209 | 7.4 | 540 |
| 360 | 218 | 7.2 | 680 |
| Res. | — | 27.1 | 700 |

*The fraction distilled at 170° C., the M.W. of which, determined by gas chromatography, is equal to 400, contains 8.1% of chlorine and, assuming that the product contains only one atom of chlorine per molecule, a molecular weight equal to 440 is calculated. An acidimetric titration indicates an equivalent weight of 410, while the NMR analysis permits one to calculate a M.W. equal to 400.

From the distillate, 7.4 g of perfluoroether oil were demixed, for which, on the basis of the NMR ¹⁹F spectrum, a molecular weight of 1100 was calculated. The infrared analysis confirmed that said oil did not contain carbonyl groups. An amount of Cl equal to 7.7% by weight was determined, which corresponds to a molecular weight of 920, assuming that two chlorine atoms per molecule were present.

(b) A portion of 21.2 g of the product as such, as obtained in Example 2, was dissolved in 100 ml of methanol and percolated in a column ($\phi$ = 100 mm; h = 1,000 mm) filled with 100 ml (about 50 g) of a strongly basic ion exchange resin (Amberlite IRA 400), which has been previously activated with NaOH and washed with $H_2O$.

The resin fixed the acid and, after evaporation of the eluate, 0.78 g (equal to 3.7% by weight of the starting product) of neutral product was collected.

EXAMPLE 8

(Purification and Characterization of the Acids

The salts coming from the test of Example 7 (a) were treated with concentrated HCl and were heated to a temperature of 70° C. At this temperature they were maintained for 5 hours under stirring. On completion of the reaction, 161 g (equal to 87.3%) of acid perfluoropolyethers were separated, which, subjected to structural analysis, gave the following results.

was switched on, and irradiation and feeding of the reagents were continued for 5 hours.

The gases leaving the reactor were eliminated after undergoing an alkaline washing.

After a five-hour irradiation, the lamp was switched off and the solvent was removed from the reactor by evaporation at room temperature. Thus, an oily polymeric residue was obtained. This residue was subjected to iodometric analysis in order to calculate the active oxygen content, and to NMR $^{19}F$ analysis, which revealed that the residue was composed of polyether chains of the type:

$$T'O\,(CF_2CF_2O)_n\,(CF_2O)_m\,(O)_v\,Y' \qquad (V)$$

with

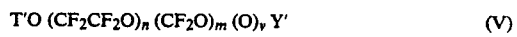
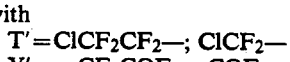

The m/n ration was dependent on the synthesis conditions (temperature) and ranged from 0.5 to 2.

The product viscosity at 20° C. was determined by means of an OSTWALD-FENSKE viscosimeter.

Reaction conditions and characteristics of the oil so produced are indicated below in Table 3.

TABLE 3

| Example No. | T (°C.) | $O_2/C_2F_4$ | $C_2F_4$/CTFE | Time (h) | Amount (g) | Viscosity | P.O. | M.W. | Y'/T' (1) |
|---|---|---|---|---|---|---|---|---|---|
| 9 | −40 | 2 | — | 5 | 163 | 24,000 | 2.9 | — | — |
| 10 | −40 | 2 | 53 | 5 | 207 | 550 | 3.1 | 7,300 | 1.1 |
| 11 | −40 | 2 | 27 | 5 | 188 | 93 | 3.0 | 3,940 | 1.1 |
| 12 | −40 | 2 | 14 | 5 | 185.5 | 44 | 3.0 | 2,240 | 1.2 |
| 13 | −40 | 2.33 | 22 | 5 | 184.0 | 49 | 3.0 | 3,100 | 1.06 |
| 14 | −40 | 2.37 | 9.3 | 5 | 141 | 11 | 2.8 | 1,470 | 1.13 |
| 15 | −40 | 2.35 | 11.0 | 5 | 145 | 15.1 | 2.6 | 1,610 | 1.15 |
| 16 | −40 | 2.46 | 5.0 | 5 | 130 | 5.1 | 3.0 | 960 | 1.18 |
| 17 | −60 | 3.5 | 36 | 5 | 173 | 164 | — | 5,000 | 1.1 |
| 18 | −60 | 3.5 | 19 | 5 | 163 | 40 | 2.5 | 2,700 | 1.2 |
| 19 | −45 | 3 | 50 | 5 | n.d. | 176 | 2.0 | 5,000 | 0.9 |

(1) Note: The ratio values > 1 indicate that some neutral end groups T' consist of acid end groups Y'; the contrary happens when the ratio value is < 1.

The molecular weight, determined by NMR analysis, was 860, with the molecular structure being in accordance with the above general formula (Examples 1–4), where Y' is for 95% equal to $-CF_2COOH$.

The chlorine content was equal to 3.7% by weight, corresponding to a molecular weight of 960 on the assumption that the product contained one atom of Cl per molecule. Acidimetric titration indicated an equivalent weight of 950.

EXAMPLE 9–19

Photooxidation of $C_2F_4 + CFCl = CF_2$

Into a cylindrical glass reactor (diameter=80 mm, volume=about 500 cc) equipped with an inner coaxial quartz sheath of 20 mm of diameter, and furthermore equipped with a dipping pipe for the introduction of the gases and with a reflux cooler maintained at a temperature of −80° C., 500 cc of A-12 ($CF_2Cl_2$) were introduced. Through the dipping pipe, a gaseous mixture consisting of oxygen, TFE and CTFE were bubbled into the reactor. By means of refrigerating bath placed outside the reactor, the temperature of the reacting liquid phase was maintained at the operating temperature indicated below in Table 3 for the whole duration of the test. After having introduced into the quartz sheath an ultraviolet-ray lamp type HANAU TQ 150 (which emits 47 watts of ultraviolet radiation having a wave-length ranging from 2000 to 3000 Å), the lamp

EXAMPLE 20

Hydrolysis, Thermal Treatment and Esterification

The product obtained in Example 19 was thermally treated (up to a temperature of 200° C., for 3 hours, with a weight loss of 20%) in order to remove peroxy oxygen. After this treatment, the viscosity of the sample was equal to 56.

A portion of the product so obtained was treated with humid air until complete hydrolysis of the end groups consisting for 100% of $-CF_2COF$.

After this treatment the product, subjected to NMR $^{19}F$ analysis, proved to be composed of perfluoropolyether chains in accordance with the above formula V, where v=o, $Y'=-CF_2COOH$ and $T'==CF_2Cl$ and $-CF_2CFCl$, and where the Y'/T' ratio was equal to 0.9 and the m/n ratio was equal to 1.4 with a molecular weight equal to 5,000.

A thermally treated portion of the product was esterified with methanol. The resulting esterified product, in which $Y'=-COOCH_3$, was subjected to $^{19}F$ and $^1H$ NMR analysis and confirmed the data reported above.

EXAMPLES 21–23

Photooxidation of $C_3F_6 + C_2F_4 + CFCl = CF_2$

In a photochemical reactor as described in Example 1 and containing the same amount of $C_3F_6$, a photosynthesis was carried out after having bubbled into the reactor, through the dipping pipe, a gaseous mixture consisting of TFE and CTFE.

At the end of the test the lamp was switched off, the reactor was degassed, and the unreacted $C_3F_6$ was recovered from the reaction mixture by evaporation at room temperature.

An oily polymeric residue was obtained. This residue was subjected to iodometric anlaysis in order to calculate the active oxygen content, and to $^{19}F$ NMR analysis, which revealed that it was composed of polyether chains of the type:

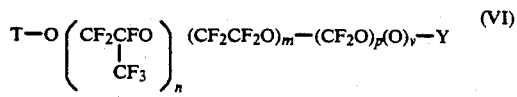
(VI)

where:

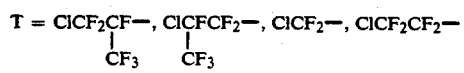

with a marked prevalence of the first two types;

with a marked prevalence of the first type.

In these examples, the m/n ratio ranged from 0.5 to 3 and the p/m+n ratio ranged from 0.01 to 0.05.

Table 4 shows the action conditions as well as the characteristics of the oil produced.

TABLE 4

| Example No. | T (°C.) | Time (h) | $O_2$ l/h | CTFE l/h | TFE l/h | Product g/h | P.O. | Viscosity cSt |
|---|---|---|---|---|---|---|---|---|
| 21 | −40 | 5 | 27 | 1 | 2 | 84 | 0.78 | 28 |
| 22 | −60 | 5 | 27 | 1 | 2 | 54 | 0.62 | 31 |
| 23 | −60 | 3 | 27 | 1 | 2 | 51 | 0.77 | 19 |

EXAMPLE 24

Photooxidation of $C_3F_6 + CFCl=CFCl$

A photosynthesis at a temperature of −60° C. was carried out in a photochemical reactor like that described in Example 1, into which, through the dipping pipe, a gaseous mixture (27 l/h), was bubbled, in which the $O_2/C_2F_2Cl_2$ ratio (by volume) was equal to 3.

After a two-hour reaction, the lamp was switched off, the reactor was degassed, and the unreacted $C_3F_6$ was recovered from the reactor by evaporation at room temperature.

Discharged was a product (51 g) which, on iodometric analysis, exhibited an active oxygen content equal to 0.34.

On NMR $^{19}F$ analysis it was shown to be composed of polyether chains of type:

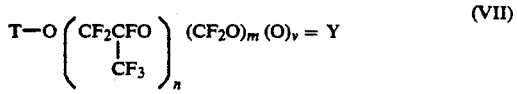
(VII)

with a marked prevalence of the first type; and

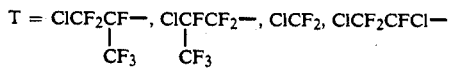

with a marked prevalence of the first two types.

The m/n ratio was of the order of 0.015.

The product viscosity, determined at 20° C. by means of an OSTWALD-FENSKE viscosimeter, was of 3.3 cSt.

EXAMPLE 25

Photooxidation of $C_3F_6$ with $CFBr=CF_2$

In a photochemical reactor like that described in Example 1, charged with 800 g of $C_3F_6$, a polysynthesis at a temperature of −64° C. was carried out, where oxygen and $BrC_2F_3$ in a ratio of 2.4/1 volume, with a total flow-rate of 2 l/g, were separately bubbled into the reactor liquid. The gaseous reagents had been previously diluted with helium (18 l/h). After 5 hours, the lamp was switched off and the unreacted $C_3F_6$ was recovered by evaporation at room temperature. 43.1 g of an oily product were obtained which, on iodometric analysis, revealed an active oxygen content of 0.43%.

The product has a viscosity of 6.95 cSt, and the NMR $^{19}F$ analysis proved that the polyether was composed of perfluoropolyether structure of the type:

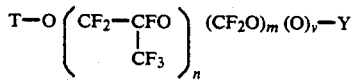

where:

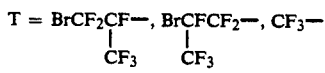

with a marked prevalence of the first two types; and

with a marked prevalence of the first type, and having a molecular weight of 800 and an m/n ratio equal to 0.05.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The references are hereby incorporated by reference.

What is claimed is:

1. A process for preparing the perfluoropolyethers consisting of randomly distributed sequences of perfluorooxyalkylene units selected from the group consisting of

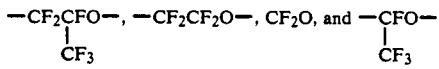

and having an acid end group, the other end group being a perfluoroalkyl group containing one or two atoms of a halogen other than fluorine, and comprising the following formulas:

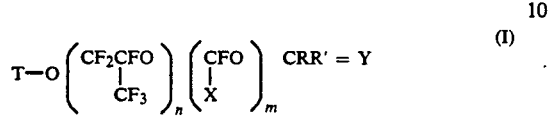 (I)

where: X is F or CF$_3$, R=F or Cl or Br or I, R', alike or different from R, is also F or Cl or Br or I,

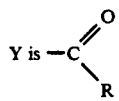

wherein:

R is the same as described above or it is the corresponding carboxylic group —COOH or the salts and esters thereof, T is a perfluoroalkyl group containing one or two atoms of Cl or Br or I, such as Alog CF$_2$—,

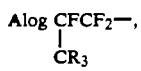

Alog CF$_2$CF(CF$_3$)—, wherein Alog is Cl or Br or I; or in other words, a perfluoroalkyl group wherein one or two of the halogen atoms may be chlorine or bromine or iodine, the remaining halogen atoms being fluorine;

n ranges from 1 to 15;

with m/n being between 0.01 and 0.5, and

 (II)

where:

T'=Alog CF$_2$CF$_2$—, Alog CF$_2$—, Alog CF$_2$CF(Alog)—,

R, R' Alog, Y are the same as defined above for formula (I), p ranges from 1 to 20, s/p from 0.5 to 2,

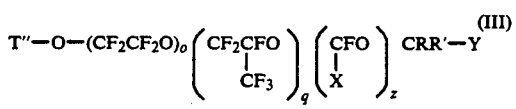 (III)

where:

Y, X, R, and R' are the same as defined above for formula (I), and

T' is equal to T or T', o and g are integers, zero included, o+g=1–20, and z/o+g ranges from 0.01 to 0.05, comprising, photooxidizing C$_3$F$_6$ and/or C$_2$F$_6$ and/or C$_2$F$_4$ in the presence of a perhalogenated ethylene containing at least an atom of halogen different from fluorine, at a temperature from −20° to −100° C., with gaseous oxygen, with ultraviolet irradiation of the liquid reaction mixture, and subsequently eliminating the peroxide groups by heat-treatment at 180°–220° C., or by photochemical treatment with ultraviolet radiations.

2. Perfluoropolyether mixtures comprising at least 50% by weight of perfluoropolyethers consisting of randomly distributed sequences of perfluorooxyalkylene units selected from the group consisting of

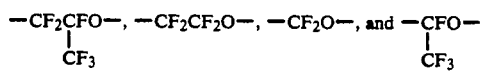

and having an acid end group or a perfluoroalkyl group containing one or two atoms of a halogen other than fluorine at a first end, and having an acid end group or a perfluoroalkyl group consisting one or two atoms of a halogen other than fluorine at a second end of the following formulas:

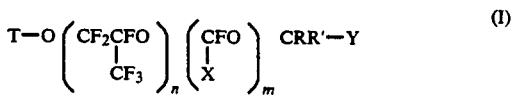 (I)

where: X is F or CF$_3$, R is F, Cl, Br or I, R', alike or different from R, is F, Cl, Br or I,

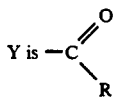

wherein:

R is the same as defined above or it is the corresponding carboxylic group —COOH or the salts and esters thereof;

T is a perfluoroalkyl group containing at least one fluorine atom and containing one or two atoms of Cl, Br or I;

n is greater than 15;

with m/n being between 0.01 and 0.5; and

 (II)

wherein:

T'=Alog CF$_2$CF$_2$—, Alog CF$_2$—, Alog CF$_2$CF(Alog)—,

R, R', Y are the same as defined above for formula (I), Alog is Cl, Br or I, p is greater than 20, s/p from 0.5 to 2; and

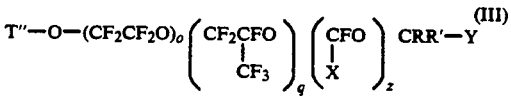 (III)

wherein:

Y, X, R, and R' are the same as defined above for formula (I), and

T" is equal to T or T', o and q are integers, zero included, o+q is greater than 20, and z/o+q ranges from 0.01 to 0.05; and wherein the end groups ratio: T or T' or T" to Y of the mixtures is about 1.

3. A perfluoropolyether consisting of randomly distributed sequences of perfluorooxyalkylene units selected from the group consisting of

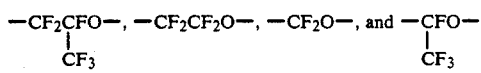

and having an acid end group, the other end group being a perfluoroalkyl group containing one or two atoms of a halogen other than fluorine, of the following formula:

$$T-O\left(CF_2\underset{CF_3}{\underset{|}{C}}FO\right)_n\left(\underset{X}{\underset{|}{C}}FO\right)_m CRR'-Y \quad (I)$$

wherein: X is F or $CF_3$, R is F, Cl, Br or I, R', alike or different from R, is F, Cl, Br or I,

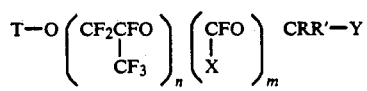

wherein:
R is the same as defined above or it is the corresponding carboxylic group —COOH or the salts and esters thereof;
T is a perfluoroalkyl group containing at least one fluorine atom and containing one or two atoms of Cl, Br or I;
n ranges from 1 to 15;
with m/n being between 0.01 and 0.5; or $$T''-O-(CF_2CF_2O)_o\left(CF_2\underset{CF_3}{\underset{|}{C}}FO\right)_q\left(\underset{X}{\underset{|}{C}}FO\right)_z CRR'-Y \quad (III)$$

wherein:
Y, X, R, and R' are the same as defined above for formula (I), and
T" is equal to T or T', o and q are integers, zero included, o+q=1-20, and z/o+q ranges from 0.01 to 0.05.

* * * * *